Patented Feb. 5, 1952

2,584,284

UNITED STATES PATENT OFFICE 2,584,284

COPOLYMERS OF TRIFLUOROCHLORO-ETHYLENE AND STYRENE

Frank Gardiner Pearson, Bryn Mawr, Pa., assignor to American Viscose Corporation, Wilmington, Del., a corporation of Delaware No Drawing. Application October 1, 1948, Serial No. 52,411

3 Claims. (Cl. 260—87.5)

This invention relates to polymeric materials and more particularly to copolymers obtained from trifluorochlorethylene and styrene. The object of the invention is to produce new and useful compositions comprising copolymers of trifluorochlorethylene and styrene, especially those containing from about 20 to 65 mole percent of trifluorochlorethylene.

A preferred embodiment of the invention is illustrated by the following examples in which the proportions of reactants are given in parts by weight unless otherwise indicated.

Example I 14.4 parts of trifluorochlorethylene and 5.44 parts of styrene were sealed in a glass pressure reactor together with 20 parts of a 5% aqueous solution of the lauryl ether of a polyoxyethylene glycol as emulsifying agent and 1%, based on monomer weight, of a mixture of equal parts of lead tetraethyl and tertiary butyl hydroperoxide as catalyst. The reactor was agitated before a mercury vapor lamp for 336 hours at a temperature of 50° C., at the end of which time the reactor was cooled in a dry ice-acetone bath and opened. The product occurred as a white powder amounting to 13.7 parts and was found, by analysis, to contain 63 mole percent of trifluoroethylene. It softened between 100 and 110° C. and melted between 210 and 230° C.

Example II

A mixture of 10.8 parts of styrene and 4.76 parts of trifluorochlorethylene polymerized under the conditions disclosed in Example I. The copolymer was obtained in an amount of 11.3 parts and found, by analysis, to contain 83 mole percent of styrene. It softened at about 100° C. and melted at 240° C.

As is obvious from the examples the ratio of trifluorochlorethylene to styrene in the starting monomer mixture may be varied, useful products being obtained with mixtures containing from 5 to 95% based on the total weight of the two ingredients, of either compound.

The catalysts preferred for use in the practice of this invention are mixtures of lead tetraethyl with a peroxy compound, that is with a compound which contains an -O-O-linkage, e. g., with diacyl peroxides such as benzoyl peroxide, soluble salts of persulfuric acid such as ammonium and potassium persulfate, dialkyl peroxides such as diethyl peroxide, and alkyl hydroperoxides such as tertiary butyl hydroperoxide. If desired, lead tetraethyl may be used alone as catalyst.

The process of the invention is generally conducted at temperatures within the range of 40 to 100° C. and preferably within the range of 50 to 60° C., depending on the catalyst used.

The pressure used will depend upon the temperature and monomer ratio, the pressure being such as to maintain the monomer mixture in the liquid phase.

The products of this invention are adapted to a variety of uses. They may be used in molding plastics, films, foils, fibers, and as adhesives, and in the coating of wire for purposes of insulation. For many of these purposes the copolymers may be combined with or prepared in the presence of plasticizers, stabilizers, fillers, pigments, dyes, natural resins, or other synthetic resins.

As a number of apparently widely different embodiments of this invention may be made without departing from the spirit and scope thereof, it is to be understood that the invention is not limited to the specific embodiments thereof except as defined in the appended claims.

I claim:

1. The copolymerization product of trifluorochlorethylene and styrene containing, in the polymer molecule, from 20 to 65 mole percent of trifluorochlorethylene and from 35 to 80 mole percent of styrene.

2. The copolymerization product of trifluorochlorethylene and styrene containing 63 mole percent of trifluorochlorethylene and 37% of styrene in the polymer molecule.

3. The copolymerization product of trifluorochlorethylene and styrene containing 83 mole percent of styrene and 17 mole percent of trifluorochlorethylene in the polymer molecule.

FRANK GARDINER PEARSON.

REFERENCES CITED

The following references are of record in the file of this patent:

UNITED STATES PATENTS

| Number | Name | Date |
|---|---|---|
| 2,436,144 | Howk et al. | Feb. 17, 1948 |
| 2,440,090 | Howk et al. | Apr. 20, 1948 |
| 2,468,664 | Hanford | Apr. 26, 1949 |
| 2,479,367 | Joyce et al. | Aug. 16, 1949 |

FOREIGN PATENTS

| Number | Country | Date |
|---|---|---|
| 578,168 | Great Britain | June 18, 1946 |

OTHER REFERENCES

McBee et al., J. A. C. S., Abstract of Papers presented 112th Meeting, Sept. 1947, page 14J (1947).